United States Patent [19]

Takeda et al.

[11] 4,117,502
[45] Sep. 26, 1978

[54] CAMERA PROVIDED WITH RECORDER FOR LIGHT OF LIGHT SOURCE

[75] Inventors: Susumu Takeda, Hino; Kiyoaki Hazama, Hachiosi, both of Japan

[73] Assignee: Konishiroku Photo Industry Co., Ltd., Tokyo, Japan

[21] Appl. No.: 813,523

[22] Filed: Jul. 7, 1977

[30] Foreign Application Priority Data

Jul. 14, 1976 [JP] Japan .................................. 51-83808

[51] Int. Cl.² ............................................ G03B 17/24
[52] U.S. Cl. .................................................. 354/106
[58] Field of Search ............... 354/105, 106, 150, 152, 354/154, 155, 158

[56] References Cited

U.S. PATENT DOCUMENTS

| | | | |
|---|---|---|---|
| 2,210,610 | 8/1940 | White | 354/105 UX |
| 3,052,169 | 9/1962 | Papke | 354/154 |
| 3,142,235 | 7/1964 | Siegmund | 354/150 |
| 3,710,699 | 1/1973 | Mitani | 354/152 X |
| 3,995,289 | 11/1976 | Shono | 354/105 X |

Primary Examiner—Donald A. Griffin
Attorney, Agent, or Firm—James E. Nilles

[57] ABSTRACT

A camera provided with a device for recording the ambient light in photographed scene on a photosensitive material. In this light recorder built-in camera, the light of a main light source is projected and recorded at a position corresponding to an object image-projected face of a color film and when a color print is formed from a positive color photosensitive material, by using the density of the light of the main light source obtained by subjecting the color film to a development treatment, exposure quantities of blue, green and red colors are determined.

5 Claims, 4 Drawing Figures

CAMERA PROVIDED WITH RECORDER FOR LIGHT OF LIGHT SOURCE

This invention relates to a camera provided with a device for recording the ambient light in photographed scene on a photosensitive material together with the image of an object.

The applications, Japanese Patent Application No. 90,479/75, U.S. patent application No. 701,018, West German patent application No. P26 33 053.0 and British patent application No. 29508/76 proposed a new color printing process. This process comprises the steps of exposing a first color photosensitive material to a light reflected from an object and an object-illuminating light, developing the exposed material to obtain a negative film bearing the negative image of the object and the record of the object-illuminating light and printing a positive image of the object on a second color photosensitive material wherein exposure amount given to the second color photosensitive material in the printing step is determined so that the record of the object-illuminating light on the negative film is printed on the second color photosensitive material as neutral gray density. By this process, positive images very faithful to the object in photograph density and color are obtained because the effect on finished positive prints by the color and intensity of the object-illuminating light or the color of a light source is eliminated.

A camera according to the present invention is used in such new color printing process.

Therefore, the object of the present invention is to provide a camera for use in the above mentioned new color printing process.

Another object of the present invention is to provide a camera capable of recording a reference density for color printing on a color photosensitive material without failure.

Other objects, features and advantages of the present invention will be apparent from the detailed description given hereinafter by reference to the accompanying drawings.

The present invention will now be described in detail by reference to the accompanying drawings.

Figure 1:
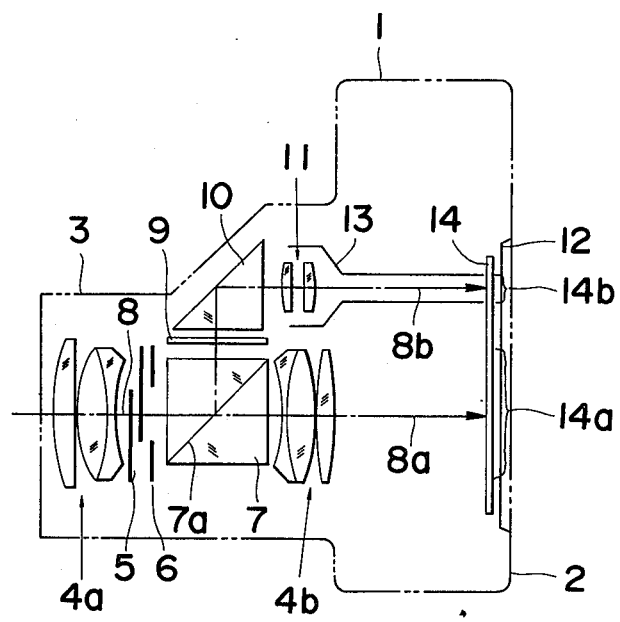
FIGS. 1 and 2 are side views illustrating the embodiments of the camera according to the present invention, respectively.

Referring now to FIG. 1, a camera body 1 comprises a camera frame 2 disposed in the rear portion and a lens barrel 3 disposed in the front portion. A color photographic photosensitive material 14 is disposed in the camera frame 2. A front group of photographing objective lenses 4a and a rear group of photographing objective lenses 4b are disposed in the lens barrel 3, and a shutter 5 and an iris blade 6 are also disposed between the groups of photographing objective lenses 4a and 4b. A semi-transparent mirror 7a having an inclination angle of 45° is provided in a prism 7, and this prism 7 is disposed on the optical path 8 between the iris blade 6 and the rear group of photographing lenses 4b. A light diffusion plate 9 (hereinafter referred to as "diffusion plate") is disposed to receive a part of the photographing light reflected from an object to be photographed and then from the semi-transparent mirror 7a. A convergence lens 11 is disposed so that the light diffused by the diffusion plate 9 through a reflecting mirror 10 is efficiently guided onto the portion 14b of the photosensitive material 14 in the camera frame 2. 12 is a plate for supporting the photosensitive material. The shutter 5 and the iris blade 6 are of well known type and hence are controlled and drived by known mechanism.

At the photographing operation, the shutter 5 is opened, whereby the photographing light which has passed through the front group of lenses 4a and the iris blade 6 is guided onto the semi-transparent mirror 7a. A part 8a of the photographing light then passes through the semi-transparent mirror 7a and is projected onto the portion 14a of the photosensitive material through the rear group of photographing lenses 4b.

Figure 2:
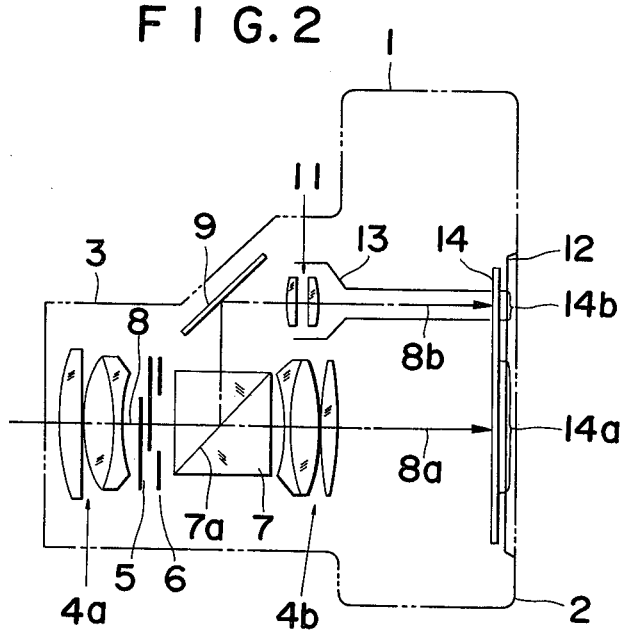

FIG. 2 illustrates another embodiment of the camera of the present invention which differs from the embodiment shown in FIG. 1 in the point that the diffusion plate is disposed at the position of the reflecting prism 10 in FIG. 1, whereby the diffusion plate 9 is arranged to perform the functions of both reflecting and diffusing the photographing light. On the other hand, the light 8b reflected by the semi-transparent mirror 7a impinges on the portion 14b of the photosensitive material 14 through a diffusion plate 9, a prism 10 and convergence lens 11. The light 8a is focused by the objective lenses 4a and 4b on the color photosensitive material 14. 13 is a light shielding tube.

It is noted that the angle of view with respect to the light incident upon the diffusion plate is much larger than that with respect to the light incident upon the portion 14a of the photosensitive material 14. Therefore, the light designated by 8b is different from the light designated by 8a in color and intensity. The portion 14a of the photosensitive material 14 receives the light forming image of the object and the portion 14b of the photosensitive material 14 receives the ambient light in a photographed scene. In the aforesaid earier applications, a light diffusion plate is mounted on a front face of the camera body or the lens barrel. Therefore, in this case, the angle of view with respect to the light incident upon the portion 14b of the photosensitive material 14 is about 180°. By such a wide angle, the portion 14b receives the light substantially equal to the light illuminating the object. However, according to the photographic tests practically carried out, it was found that in order to record the object-illuminating light on the photosensitive material, it is not necessary to record the light with such a wide incident angle and hence even in the case that the light passed through the optical system shown in FIG. 1, the light analogous substantially equal (in case of daylight photographing) to the object-illuminating light in color and intensity is recorded on the photosensitive material.

In the present invention, since the light passed through a part 4a of the objective lenses is recorded on the portion 14b of the photosensitive material 14, the object-illuminating light recording is conducted without any failure at photographing.

In the above-mentioned embodiment, the lens 11 and the light shielding tube 13 can be replaced by an optical fiber tube or a glass block.

Still another embodiment of the present invention will be described by reference to FIG. 3.

Figure 3:
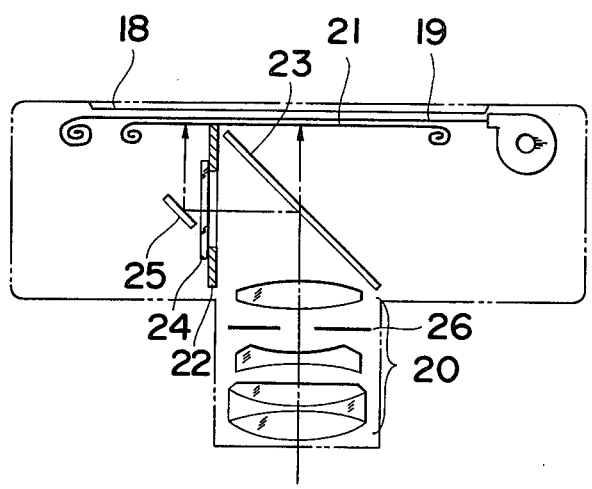
FIG. 3 is a plan view illustrating another embodiment of the camera according to the present invention.

In FIG. 3, 18 is a plate for supporting a photo- sensitive material, 19 a photosensitive material, 20 an objective lens, 21 a focal plane shutter which is of known type, 22 an opaque frame, 23 a semi-transparent mirror, 24 a diffusion plate, 25 a reflector, and 26 a diaphragm (which is of known type). This camera operates with known mode wherein the light diffused by the diffusion plate 24 is recorded on the photosensitive material 19 as shown in FIG. 4 together with an image of an object.

Figure 4:
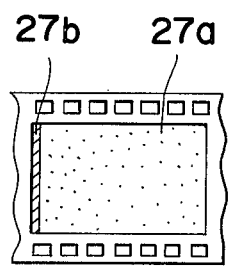
FIG. 4 is a front view showing the exposure state of a photosensitive material.

In FIG. 4, 27a designates a portion recording the image of the object and 27b a portion recording the light diffused by the diffusion plate 24.

What is claimed is:

1. A camera comprising:
   a. objective lens means comprising a plurality of lenses,
   b. an exposure control means for controlling the amount of image-forming light,
   c. a support means for supporting a photosensitive material on a focal plane,
   d. light diffusion means,
   e. means for directing light passed through at least a part of said objective lens means to said light diffusion means, and
   f. optical guide means for guiding the light from said light diffusion means to the photosensitive material, wherein the light incident upon the photosensitive material, which light passed through said light diffusion means, is regulated in relaton to the control by said exposure control means.

2. A camera as defined in claim 1 wherein said exposure control means comprises a diaphragm and a shutter.

3. A camera as defined in claim 2 wherein said exposure control means is located within said objective lens means.

4. A camera as defined in claim 2 wherein said shutter is located on a substantially focal plane.

5. A camera as defined in claim 1 wherein said light-directing means is a beam splitter located in the path of an image forming light.

* * * * *